United States Patent [19]

Sanson

[11] 4,115,170

[45] Sep. 19, 1978

[54] CUSHION OR SEAT STRUCTURE OF PLASTIC FOAM WITH INTEGRATED COVER AND INCORPORATED REINFORCING GRID OR SKELETON, AND METHOD OF MAKING SAME

[75] Inventor: Joseph F. Sanson, Beaugency, France

[73] Assignee: The Upjohn Company, Kalamazoo, Mich.

[21] Appl. No.: 786,126

[22] Filed: Apr. 11, 1977

[30] Foreign Application Priority Data

Feb. 22, 1976 [FR] France .................. 76 11950

[51] Int. Cl.² .................................... A47C 7/18
[52] U.S. Cl. ........................ 156/79; 264/46.5; 264/46.6; 264/46.8; 297/452; 297/DIG. 1
[58] Field of Search ............ 264/46.5, 46.6, 46.8; 156/78, 79, 242, 245, 77; 297/452, DIG. 1

[56] References Cited

U.S. PATENT DOCUMENTS

| 3,161,436 | 12/1964 | Hood | 264/46.6 |
| 3,270,393 | 9/1966 | Levenson | 264/46.6 |
| 3,589,967 | 6/1971 | Shirakawa | 156/79 |

Primary Examiner—John E. Kittle

Attorney, Agent, or Firm—St. Onge, Mayers, Steward & Reens

[57] ABSTRACT

An integrated cushion structure, such as automobile or aircraft seat or seat back, an office chair, or the like and the method of making it, are disclosed. The cushion structure is comprised of fabric or other pliable cover sheet material forming an envelope constituting the exposed surface as well as defining the shape or configuration of the cushion structure. The structure includes at least one internal pliable sheet material partitioning member disposed parallel to and co-extensive area-wise with the active seat or back-forming area of the finished product. The envelope is thus divided interiorly by the partitioning member into several compartments into which a foam mix is introduced. The method of manufacture involves first peripherally bonding together an assemblage of congruent cover and internal partitioning sheets, together with one or more similarly configured annular profile strips, to form a peripherally closed envelope. The envelope is provided with an access opening which permits the envelope to be inverted on itself (i.e., turned inside-out) upon completion of the seaming operation, preliminary to introduction of plastic foam mix. Such access opening may also serve to allow introduction of reinforcing grids, attachment fittings, etc., before introducing the plastic foam mix.

12 Claims, 12 Drawing Figures

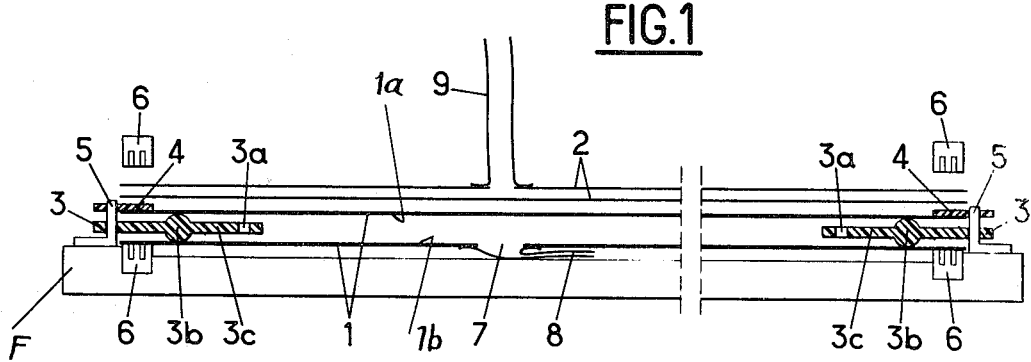
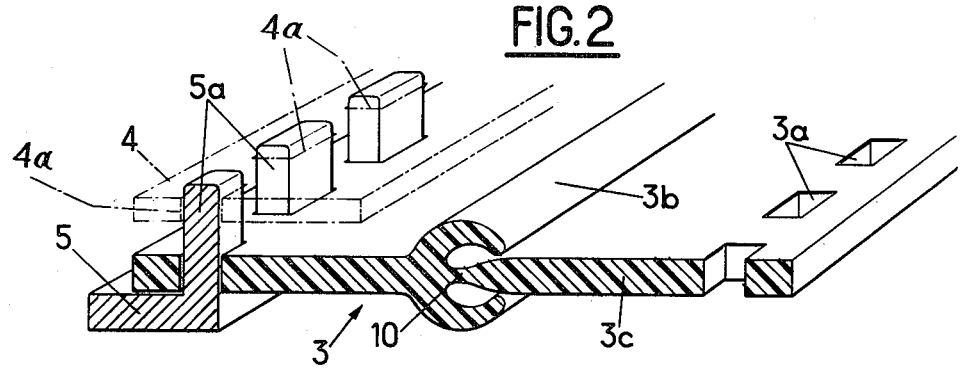
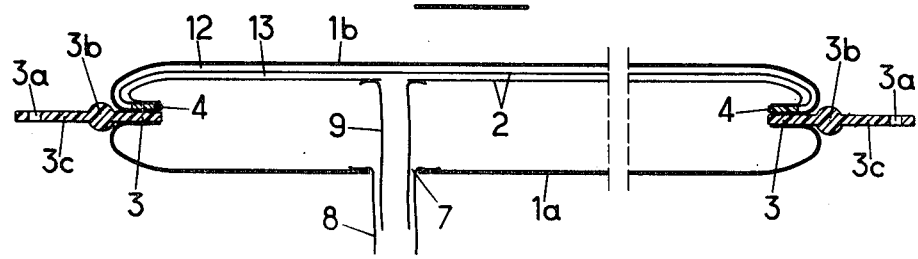
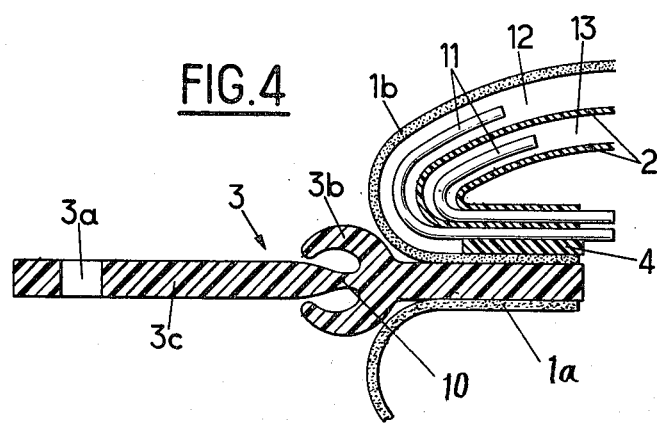

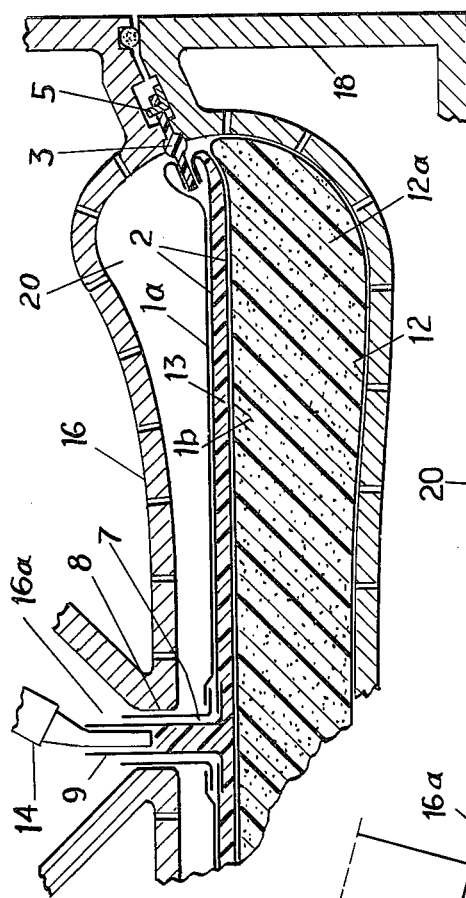
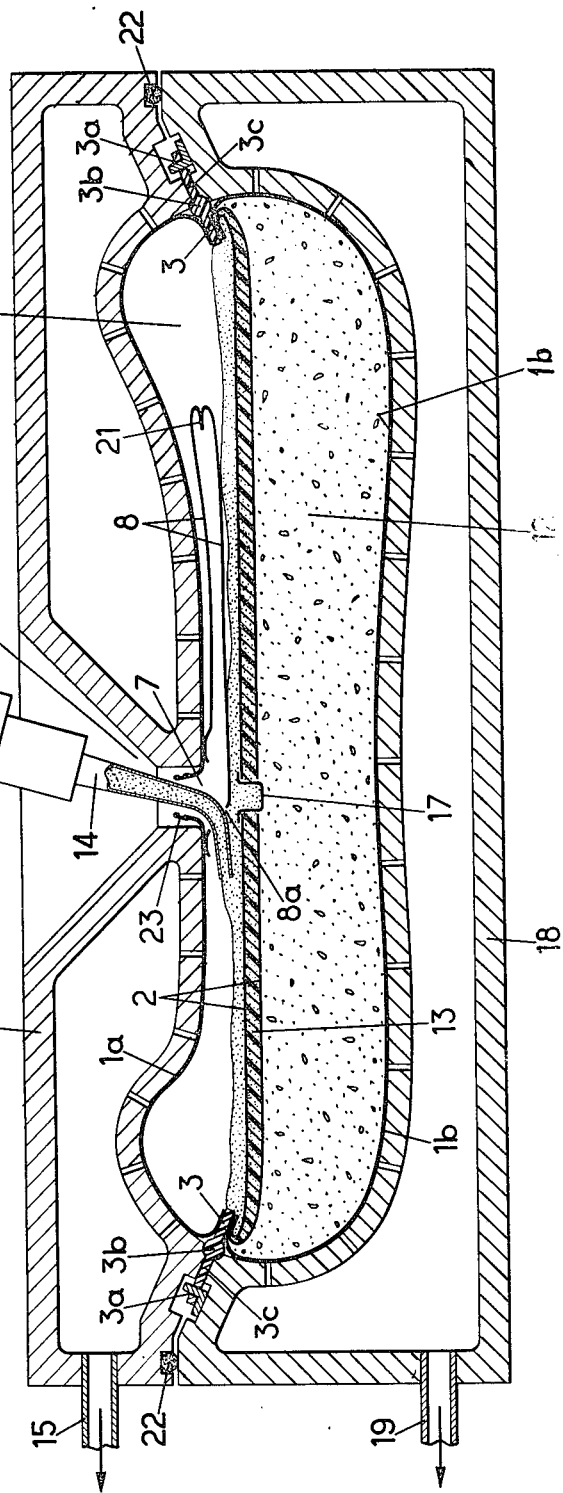
FIG.5.
FIG.5a.

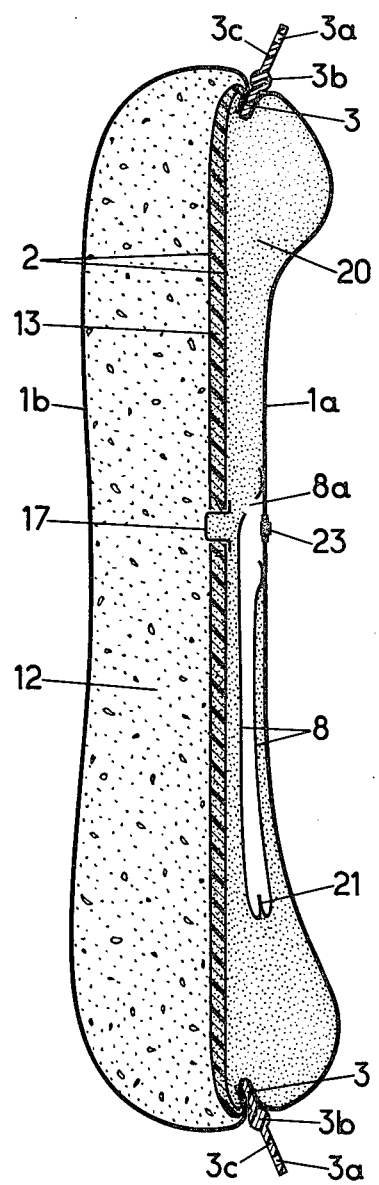
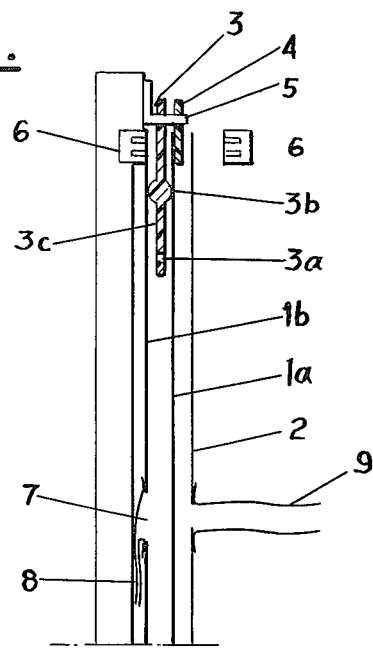
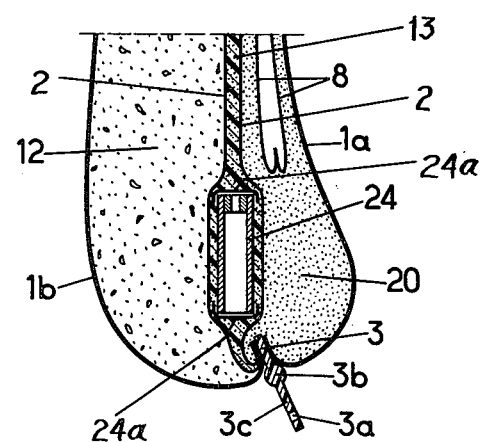

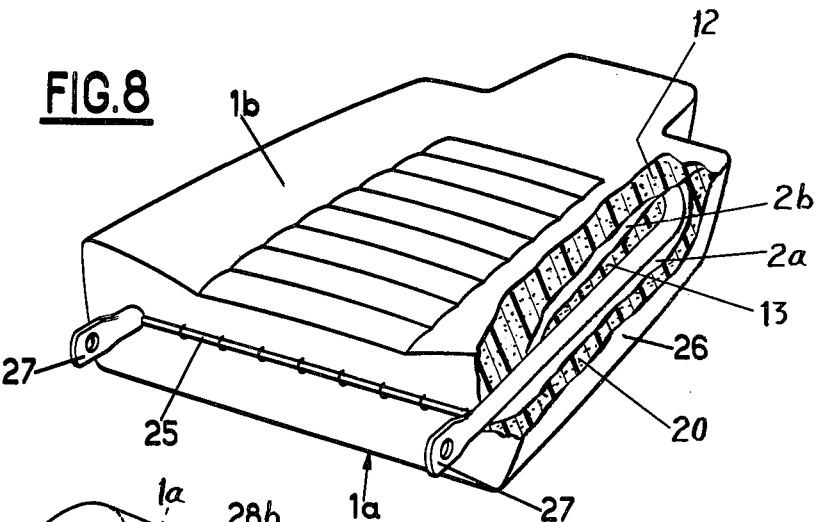
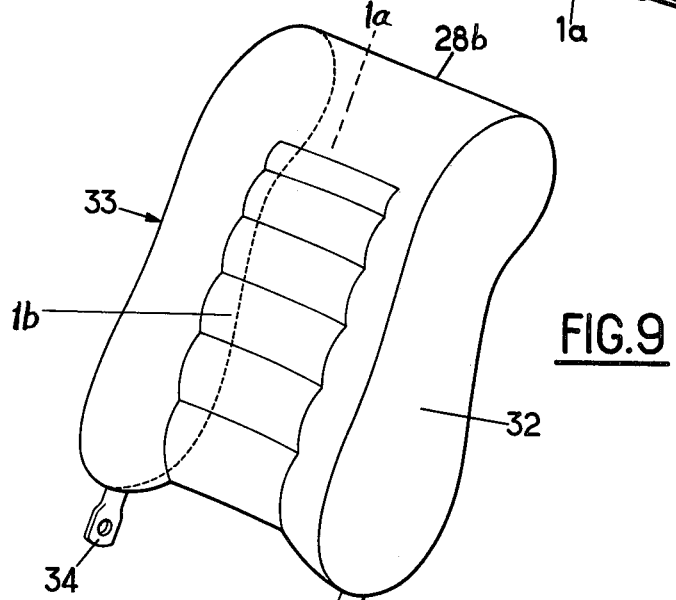
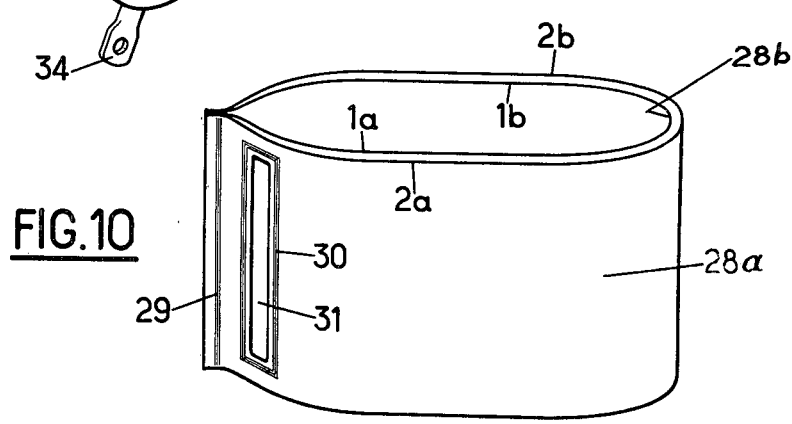

CUSHION OR SEAT STRUCTURE OF PLASTIC FOAM WITH INTEGRATED COVER AND INCORPORATED REINFORCING GRID OR SKELETON, AND METHOD OF MAKING SAME

BACKGROUND OF THE INVENTION

1. Field of the Invention

The present invention relates generally to cushion or seat structures for automobiles, aircraft, office or home furniture, and similar items wherein a plastic foam is employed to integrate a pliable fabric-like cover and a reinforcing grid or skeleton; also to methods of making such structures.

2. Description of the Prior Art

A method has been described in applicant's prior U.S. Pat. No. 4,046,611 granted Sept. 9, 1977 for making cushions of plastic foam with integrated fabric cover, wherein the method involves a preliminary operation of preshaping the cover sheet in such manner as to take advantage of its capabilities for peripheral shrinkage in order to avoid formation of wrinkles in the preshaped blank resulting from the preshaping operation. Such preshaping is done preliminary to vacuum molding of the cover sheet into its final configuration, and to its integration with plastic foam introduced into the mold while the cover sheet is held by vacuum in conformity with the mold surface.

It has also been disclosed in applicant's prior U.S. application Ser. No. 557,247, filed Mar. 11, 1975 to vacuum form a fabric or sheet plastic cover as part of an integrated cushion structure, by the use of a perforated or air pervious elastic diaphragm, supported across the mold cavity, over which the cover sheet is placed preliminary to vacuum forming. The surface of the diaphragm is made non-sliding relative to the cover sheet, with the result that the final drawing or tensioning of the cover sheets in the forming and molding process, as well therefore as the thickness of the sheets, are kept substantially uniform over the entire surface of the final cushion structure.

And finally, in applicant's prior French application No. 74/06942, filed Feb. 28, 1974, there is described a method for making cushions or seats of plastic foam, wherein different areas of an integrated cover can be formed of different fabrics or films. The method there disclosed in particular employs means for locking the various portions of the cover fabric in position on a mold, using a profile strip which projects marginally from the cover assembly. After molding, the projecting portion of the profile strip may be cut or torn away leaving a finishing bead of good appearance hiding the junction of the cover parts.

All of the methods described above lead to the embodiment of cushions with integrated covers, whose cover fabrics or sheets were stretched over plastic foam formed in situ within the cover to provide the cushion body or matrix, wherein the entire surface of the cover was uniformly tensioned or stretched and the thickness of the cover fabric was uniform, throughout the entire surface of the cushion, thus eliminating weak spots constituting points at which wear might start.

Nevertheless those prior cushion structures could not be mounted on their supports except by conventional means and this required relatively lengthy mounting times and high cost, especially because of the skilled craftwork involved. Nor were such prior cushion structures able to insure the uniformity of shape for finished seats which would be demanded in fully automated manufacture.

SUMMARY OF THE INVENTION

The present invention provides remedies for these drawbacks, and one of its principal objectives is to provide a method of manufacturing seat and cushion structures of plastic foam with integrated cover and incorporated reinforcing grid or skeleton which simplifies the mounting of the structures to legs or other supports. It can be understood that providing a reinforcing skeleton within a seat back or cushion will considerably simplify the mounting of these onto external metal supports or armatures, more particularly because it thus becomes possible to place holes which must be made in the cushions for mounting purposes at points or regions on the cushions which are largely inconspicous in normal use.

The method of the present invention is characterized first of all by the fact that there are assembled together several different layers of pliable fabrics or films which have been precut to the required contour. In some cases these have also been partially preformed or preshaped, as mentioned above, out of their initial planar condition in order to eliminate wrinkling in the finished cushion structure. The several layers of fabrics or films designed to form the external anterior and posterior parts of the finally integrated cover are superimposed in congruent relation on a jig or frame, and are suitable joined peripherally, preferably by thermal bonding using welding electrodes. It is also desirable to incorporate a pliable annular profile strip, configured similarly to the contour of the superimposed sheets, which profile strips may facilitate joining cover sheets of different fabrics or plastics where these exhibit an incompatibility for thermal bonding to each other. Some of said profile strips may also serve the further purpose, when configured to project marginally from the assemblage of cover sheets, to lock that assemblage in proper position on a forming mold during development of the plastic foam matrix of the seat or cushion. Further, the strip may also serve as a final finishing bead at the junction of the cover members, as mentioned generally above, to cover the junction of the sheets.

The method according to the invention also makes it practical to insert, for example, rigid reinforcing elements of wood, metal or preformed rigid synthetic material intended to be buried in the interior of a rigid or semi-rigid foam cast in place in the assemblage of sheets, whereby the reinforcement is designed to form the skeleton of the cushion structure. The reinforcing skeleton can be constituted, for example, of polyester resin introduced to impregnate fiberglass partitioning sheets lodged between and substantially coextensive area-wise with the active seat and back-forming areas of the finished product, whereby to obtain, for example, a one-piece office chair or the like comprised of a rigid internal skeleton separating flexible plastic foam on the anterior surface of the chair from a flexible or semi-rigid body of foam at the rear or posterior surface.

It is contemplated in the course of the welding operation, used to unite the junction or profile strip with the various layers of fabrics or films, to insert between certain of the layer small flexible tubes of appropriate length and diameter which permit trapped air to escape from compartments formed by the various layers. Such air escape is desirable in the operations of foaming the cushion matrix in place, while insuring against passage of plastic foam mix of one type from one compartment to another containing a different type.

One of the particular features of the invention resides in forming an opening in at least one of the cover layers such that the initial assemblage of cover and partitioning layers can be reversed on itself; that is, turned inside-out to dispose cover sheets on the opposite, exposed faces, with partitioning sheets sandwiched between them. Generally, it may be desirable to incorporate one or more sleeves of pliable fabric welded to respective cover or partitioning layers to communicate with respective apertures therein through which subsequent filling of the related compartments with plastic will be facilitated.

With the cover assemblage reversed, the marginal projection of the junction or profile strip can be utilized to position the assemblage on a vacuum or pressure forming mold during the foaming of the cushion structure. For this purpose it is desirable to provide the profile strip with a series of apertures which mate with a lug strip positioned peripherally of the mold, with a view to locking the assemblage accurately in predetermined relation to the mold. While in this condition, the filling sleeves mentioned above can be brought out through a port in a wall of the mold to serve as means for ducting plastic foam mix to the respective compartments of the cushion structure. In this way, different compartments may be foamed with different types of plastic mixes so as to constitute, after polymerization, either rigid or semi-rigid reinforcing skeletons, with or without supplemental preformed reinforcement, in conjunction with superimposed anterior and posterior layers of molded flexible, semi-rigid or rigid foam, as may be desired.

The foregoing successive foam injecting operations sometimes make it necessary to perforate the solid inserts or reinforcing skeletons in order to permit injection of the plastic mix through a non-exposed, unobtrusive, portion of the finished cushion structure. After unmolding, the filling sleeves may be cut flush with the surface of the structure, and the projecting portion of the profile strip torn or cut away so as to provide a neat finished bead at the juncture of the cover sheets.

As mentioned above, the present invention can include the use of non-skid elastic diaphragms in the vacuum molds, against which the cover sheets are in contact during foaming, in order to obtain uniform tensioning or stretching of the cover sheets. Simultaneously, the opposite surface of the diaphragm, i.e. the diaphragm surface adjacent the interior of the mold, may be lubricated in order to facilitate movement of the diaphragm relative to the mold where the mold configuration is of some complexity of contour.

The assemblage of cover and partitioning sheets will constitute at least three, and preferably four, layers according to whether the reinforcing skeleton is to constitute, for example, the posterior part of an office chair, or is to be located between two different compartments, e.g. anterior and posterior, of a cushion structure. For example, a skeleton placed intermediate a structure designed to have flexible foam cushioning on its active (anterior) surface, and a semi-rigid foam padding on its back (posterior) surface.

The characteristics of the present invention will be better understood on reading the description which follows, in which three embodiments given by any of non-limiting example are illustrated, all of these being directed to seat backs for automotive vehicles.

In the drawings,

FIG. 1 is a schematic representation, in section, showing a peripheral welding frame and four superimposed layers of fabric, plastic film, etc., together with a profile strip;

FIG. 2 is a perspective view on an enlarged scale, of a portion of the profile strip, showing cooperation between apertures of the strip and mating lugs of a peripheral lug strip used on the welding frame as well as the forming mold;

FIG. 3 is a schematic view of a cover and partitioning sheet envelope after inversion of the initial welded cover and partition sheet assemblage shown in FIG. 1;

FIG. 4 is an enlarged fragmentary view showing in detail an arrangement for incorporating intercompartment venting tubes in the assemblage;

FIG. 5 is a fragmentary view on cross section showing the operation of foaming the reinforcing grid compartment of a seat back structure in a two-part vacuum mold;

FIG. 5a is a similar view illustrating a subsequent stage in the successive foaming operation of the other compartments of the seat or cushion structure;

FIG. 6 is a median section of a finished seat back produced as shown in FIGS. 5, 5a;

FIG. 7 is a fragmentary sectional view showing a modification of the structure seen in FIG. 6;

FIG. 8 is a perspective view, partly in section, of another type of automotive seat back, parts being broken away to show a metal insert designed to facilitate the mounting of the seat back on feet or other support members;

FIG. 9 is a perspective view of still another type of automotive seat back, having an anterior face part united with its posterior part to form a continuous band, and being closed laterally by planar side or end panels peripherally welded thereto;

FIG. 10 is a perspective view of the continuous band used in forming the seat structure of FIG. 9, before welding of the end panels and subsequent inversion of the cover envelope; and FIG. 11 is a partial, schematic view, similar to FIG. 1 but incorporating only one partitioning member.

Referring to FIG. 1, two layers of pliable plastic film or fabric 1 designed to form, respectively, the front (anterior) and rear (posterior) cover elements of an automotive seat back, are combined with two layers 2 of pliable fabric or plastic film which latter are designed ultimately to form internal partitioning walls defining a median compartment. Such median compartment may in some cases constitute or incorporate a rigid reinforcing grid or skeleton formed in place. Layers 1 and 2 are suitably configured to the shape of the seat structure to be formed, and they are then all superimposed in congruent relation on a welding frame F, together with a similarly configured pliable annular profile strip 3 interposed between adjacent cover sheets 1a, 1b so as to project marginally thereof. A second profile strip 4 may also be employed between the adjacent cover sheet 1a and partitioning sheet 2. Such strips are especially useful where sheet members of different types not readily compatible to thermal bonding are to be joined to each other. But a major purpose of strip 3 is that of ensuring accurate registration of the layered assemblage in, and retention of it by, a forming mold in subsequent forming and foaming operations. Accordingly, profile strip 3, and also strip 4 is desired, is suitably apertured about its periphery (see 3a and 4a of FIG. 2) for reception of projecting lugs 5a of a perimeter strip 5 secured to welding frame F. The interengagement of the lugs and profile strips on the welding frame ensures proper marginal location of the strips during the welding operation. But as already mentioned, strips 3 provide a further registration function during the subsequent molding step, as more fully described hereinafter.

Welding frame F is further provided with welding electrodes 6 adapted to be clamped together on opposite faces of the assemblage of layers 1a, 1b and 2, and strips 3 and 4, whereby the layers may be welded or fusion bonded together about their periphery to form a substantially closed envelope.

Upon removing the envelope from the welding frame, an opening 7 is formed in the exposed cover sheet member 1b which will form the back cover of the seat structure, and a pliable plastic sleeve 8 is welded peripherally about the opening so as to provide communication therethrough. In the same way, a second pliable plastic sleeve 9 is secured about an opening formed in the exposed partitioning sheet 2 at the opposite face of the envelope.

Preferably the material forming cover sheets 1a, 1b comprise elastic fabric having a suitable plastic coating, for example PVC, to render it substantially air tight to facilitate vacuum (pressure) forming. In the case of partitioning layers 2, these are preferably fiberglass cloth having a PVC film, for example between 0.2 and 1.4 mm thick, suitably secured to each cloth layer.

Profile strip 3 is generally symmetrical with respect to a central rib or bead 3b, having planar flanges 3c disposed on either side of the rib. The margins of flanges 3c are apertured to provide the aforesaid openings 3a for mating engagement with the lug strips 5. As seen best in FIG. 2, central rib 3b of the profile strip consists of a pair of semicircular lips which form a mouth, being closed at the back and open at the front. Both flanges 3c are joined to the rib 3b at its closed side so that the free ends of the lips overlie one of those planar flanges and hide its connection to the rib. In order to facilitate later separation of the last-named flange from the profile strip, its connection to the strip is formed by a section 10 of reduced thickness within the encompassing lips of rib 3b. This provides a weakened section along which the flange can be subsequently torn or otherwise severed, for purposes which will appear presently.

Upon completion of the peripheral welding operation, the envelope comprised of cover sheets 1a, 1b, and partitioning sheets 2 is removed from the welding frame and, desirably, the exposed flange portion of profile strips 3 and 4 is cut off flush with the edges of the several layers. The envelope is then inverted on itself; that is it is turned inside-out through aperture 7 of cover sheet 1a by pulling the remainder of the cover and partitioning sheets through that aperture. The envelope is ultimately disposed in the condition shown in FIG. 3, wherein the cover sheets 1a and 1b are located on opposite external surfaces, while partitioning sheets 2 are disposed intermediate. This reversal can be seen in more detail in FIG. 4 which further illustrates incorporation of vent tubes 11 between successively adjacent layers so as to provide some communication between the different internal compartments of the structure. Tubes 11 are placed in position at spaced points peripherally around the structure during preparation of the assemblage shown in FIG. 1. Tubes 11 are formed of relatively thick-walled, flexible plastic tubes which resist compacting and constriction during the welding operation but which are pliable enough as not to impede the inverting of the envelope. These tubes allow trapped air to escape in the course of foaming the compartments 12 and 13 of the inverted envelope, as seen in FIG. 3. The term "foaming," as herein used, means introducing a self-foaming plastic mix which expands and polymerizes in place within the cushion structure to form either a flexible, a semi-rigid or a rigid cellular matrix, depending on the chemical nature of the mix of which a variety are well known. Obviously during the filling and expansion process, air will be displaced by the developing foam from the compartment being filled and it is necessary therefore to allow such air to escape to avoid formation of bubbles or blisters in the finished product. Tubes 11 provide adequate communication between the substantially closed compartments 12 and 13 and rear compartment 20.

Referring now to FIGS. 5 and 5a, the inverted envelope (in the condition represented in FIG. 3) is placed in a split differential pressure mold comprising upper and lower mold halves 16, 18, respectively. Before placing the envelope into the mold, a rigid foam 12a having the same volume and shape as the front or active portion of the seat structure is placed in mold half 18. This rigid foam acts as a temporary support against which the reinforcing grid or skeleton defined by compartment 13 is formed. Positioning of the envelope in the form is facilitated by engagement of peripheral lugs 5 in apertures 3a of the marginally projecting portion of profile strip 3, similar to the arrangement described in connection with the manner of forming the initial assemblage illustrated in FIG. 1. The mold is then closed and filling sleeves 8 and 9 are brought out through a port 16a in the upper mold half. Pressure is applied to chamber 20 through duct 15 and the perforated forming wall in the upper mold half, so that the envelope is pressed against the temporary rigid form 12a. Simultaneously a polyester resin is injected by mixing head 14 through filling sleeve 9 into compartment 13 defined by partitioning sheets 2. When this has polymerized and rigidified, it constitutes a rigid grid or skeleton formed in situ within the envelope intermediate the front cushion compartment 12 and the posterior compartment 20.

After having formed the rigid skeleton, the mold is opened, the envelope lifted to allow removal of the temporary form 12a from the lower half, whereupon the envelope is replaced in the mold and the latter is again closed. Profile strip 3 facilitates accurate re-registration of the envelope in the mold. Filling sleeve is cut away and a hole 7a is made through the skeleton, prior to placing the envelope back in the mold. The mold assembly is then subjected to vacuum introduced at both ducts 15 and 19 so as to cause lower cover sheet 1b to be applied against the forming wall of the lower mold half 18, while the opposing cover sheet 1a is applied against the corresponding forming wall of upper mold half 16. A flexible polyurethane foam mix is injected by the mixing head, through port 16a and the hole 17a in the rigid skeleton, and the mix is allowed to expand and fill the compartment 12 to provide the active, resilient, cushion surface of the seat structure. Aperture 17a in grid formed in compartment 13 is then plugged with a stopper 17, and a foam mix is introduced into rear compartment 20. Although the type of foam introduced into this last compartment may be the same as that in the forward compartment, generally it is preferable to introduce a semi-rigid or even a rigid polyurethane foam in forming the back of the seat structure. Introduction of the foam into compartment 20 could be done by means of filling sleeve 8; but FIG. 5 illustrates a modified arrangement which involves using the filling sleeve as an integrated pocket, such as a glove compartment, in the back of the seat structure. For this purpose, prior to foaming compartment 20, sleeve 8 is drawn out through port 16a of the mold and the terminal end of the sleeve is welded closed as at 21. The sleeve is then inverted and pushed back through port 16a so as to lie along the reinforcing grid. In this case, foaming of compartment 20 is accomplished by punching a hole 8a through sleeve 8 adjacent its point of attachment to rear cover sheet 1a. The filling nozzle of mixing head 14 in introduced through hole 8a. In the process, sleeve 8 becomes surrounded by foam to form the integrated pocket shown more fully in FIG. 6. The apertures 7 remaining in the rear cover sheet 1a may then be equipped with a slide fastener 23, as by welding this around the aperture in known manner. Finally, the marginally projecting flange 3c of profile strip 3 can be torn or cut along reduced section 10 intermediate lips 3b, leaving a substantially closed-lip bead covering the junction line around the periphery of the cushion structure, to give a finished appearance.

In a modification of the foregoing method, a cushion structure having integrated mounting elements for facilitating attachment to legs or other mounting supports is illustrated in FIG. 7. In this case, metal socket inserts 24 are disposed near the lower end of the cushion structure by incorporating these in compartment 13. The insert is introduced into the initial assemblage during its preparation on the welding frame illustrated in FIG. 1, and in order to prevent foam entering into the openings of the socket insert, the open ends are closed by means of easily rupturable caps 24a. Proper positioning of the inserts is ensured by suitably located depressions in the upper surface of temporary rigid form 12a which also acts to maintain the inserts in position during the foaming operation. After unmolding the cushion structure, mounting supports can be screwed into the inserts for attaching the structure to a vehicle, etc. in which it is to be mounted, or legs can simply be attached in similar manner.

The foregoing fabrication method for a seat back or office chair can of course be simplified by eliminating the formation of the integral pocket in the back of the chair. In such case, filling sleeve 8 can be located at some different, unobtrusive point on the seat back, such as at the bottom at the back of the chair where it will not be readily observable.

It will also be apparent that, instead of forming the reinforcing skeleton in place in compartment 13, a preformed reinforcing frame can be inserted between partitioning sheets 2 after completion of the welding and inverting of the envelope, in which case however a suitably sized aperture giving access to compartment 13 must be provided. Such an arrangement is illustrated in FIGS. 8 to 10.

In the seat back structure of FIG. 8, the initial layered assemblage of cover and partitioning sheets described in connection with FIGS. 1-3 is modified to the extent that there is also provided a peripheral band 26 to which the respective cover and partitioning sheets are welded. This band is provided with an aperture 25 in the area corresponding to the bottom of the structure, and the initially welded assemblage can thus be inverted through aperture 25 to expose the cover sheets 1a and 1b, enclosing or sandwiching the partitioning sheets 2. Reinforcing frame structure 27 is then inserted into compartment 13 define by partitions 2, and the reinforcing member 27 is subsequently integrated in the cushion structure by foaming operations corresponding to those described above. In this case, the forming mold used will consist of three parts including a cylindrical center section, corresponding to the peripheral band 26, in addition to the usual upper and lower mold halves defining the surface configurations of the front and back of the finished cushion structure.

In the type of seat back structure represented in FIG. 9, the initial assemblage of cover and partitioning sheets assumes the form illustrated in FIG. 10. Here, the several sheets comprise concentric loops 28a, 28b welded together at 29 so that the portions corresponding to the front and back of the seat structure are continuous. To this is then welded similarly configured end panels 32, 33, and the exposed band 28a is further welded to its adjacent inner band 28b along a line indicated at 30 in FIG. 10. An aperture in outer band 28a is then cut within the perimeter of weld line 30 and the envelope is inverted through aperture 31, as previously explained, to position the inner band 28b as the exposed cover surface of the finished seat structure. A suitable frame 34 can be introduced into the structure through aperture 31 and integrally incorporated by foaming it in place within the cover members, in accordance with the procedures described above.

Although not specifically here illustrated, the junction of the several layers of fabric or plastic sheet forming the initial assemblage can again utilize profile strips similar to strips 3 and 4 illustrated in FIGS. 1-4 above.

It will also be apparent that it is not always necessary to employ a pair of partitioning layers 2, more particularly where the resulting cushion structure does not rely entirely or solely upon formation of a reinforcing grid by foaming this in place in the structure. For example, where pre-formed rigid grid structures are inserted into the envelope as illustrated above, the added partitioning may not be needed. One such arrangement is illustrated in FIG. 11 which shows an assemblage of cover sheets 1a, 1b with a single partitioning sheet 2, together with profile strips 3 and 4, in a welding frame. Again, the envelope resulting from the welded assemblage will be inverted on itself, as by pulling sheet members 1a and 2 through aperture 7 of cover sheet 1b, after removing the envelope from the welding frame. The cushion structure resulting from such an arrangement will obviously have but two internal compartments corresponding generally to the anterior and posterior surfaces of the finished product.

It will be understood of course that various other changes, improvements and additions to the assemblage of the several components employed in forming the envelope, as well as in the method of foaming the envelope to provide regions of different degrees of resiliency, and in the incorporation of reinforcing grids or skeletons for structural rigidity and support, will suggest themselves to those skilled in the art without thereby altering the general concept of the invention.

What is claimed is:

1. A method of making integrated cushion structures having opposed pliable congruent cover sheet members and at least one partitioning sheet means coextensive with said cover sheets, all of said sheets being joined peripherally to define an enclosing envelope having a plurality of coextensive interior compartments, and plastic foam filling at least some of said compartments, said method comprising:

forming an assemblage of said pliable congruent cover sheet members and partitioning sheet means;

bonding said assemblage together peripherally to form said envelope;

forming an aperture in an exposed sheet of said envelope, said aperture being suitably sized and located to enable remaining portions of the envelope to be inverted therethrough;

drawing the remaining portions of said envelope through said aperture and thereby turn said envelope inside-out to dispose cover sheet members externally and partitioning sheet means internally of said inverted envelope, said partitioning sheet means dividing the interior of said envelope into at least two coextensive interior compartments; and placing said envelope into a forming mold and introducing a foamable plastic mix into at least one of said interior compartments, and allowing said mix to expand and become integrally bonded on polymerization to the surface of the respective sheets defining said compartments while in said mold.

2. The method as defined in claim 1, wherein said assemblage comprises two separate cover sheet members and at least one partitioning sheet means, said sheets being arranged to dispose one of said cover sheet members and one partitioning sheet means on opposite faces of said assemblage with said aperture in said exposed cover sheet member.

3. The method as defined in claim 2, which includes providing a pair of partitioning sheet means which, when said envelope in inverted, forms a median compartment between said cover sheets.

4. The method as defined in claim 3, which includes forming an aperture in one of said partitioning sheet means, and introducing a preformed rigid reinforcing grid into said median compartment through said aperture therein, prior to introducing said plastic foam mix into said envelope.

5. The method as defined in claim 3, which includes placing a temporary rigid form in said forming mold, said rigid form being configured to conform to the anterior compartment of the finished cushion structure, superimposing said envelope on said rigid form in said mold, closing said mold and applying pressure within said mold while introducing a rigid-setting plastic mix into said median compartment, allowing said plastic to develope in said mold until there has been formed in place in the median compartment of said envelope a rigid reinforcing skeleton for said cushion structure; opening said mold and removing said temporary rigid form, replacing said envelope and integrally formed reinforcing skeleton in the mold, closing the mold and injecting non-rigid form mix into said envelope to integrate it with said reinforcing skeleton.

6. The method as defined in claim 5, wherein the foam mix introduced into the envelope adjacent the anterior active surface of the finished cushion structure produces a flexible foam in its fully cured state, while the foam mix introduced adjacent the posterior surface of the finished cushion structure produces a semi-rigid foam in its fully cured state.

7. The method as defined in claim 6, wherein rigid attachment elements are incorporated in the median compartment prior to the forming of said rigid reinforcing skeleton, whereby said attachment elements are integrally incorporated in said structure.

8. The method as defined in claim 2, which further includes the step of incorporating a pliable annular profile strip between at least some of said sheet members.

9. The method as defined in claim 8, wherein said profile strip is positioned to project marginally at each side of the line of peripheral securement to the other members of said assemblage, said strip being apertured along each margin and making engagement with mating positioning lugs during the steps of peripherally securing said assemblage and subsequently during introduction of plastic mix while the inverted envelope is in the forming mold.

10. The method as defined in claim 2, which includes the steps of securing about said aperture in said cover sheet a pliable plastic filling sleeve, seaming the free end of said sleeve to close it and form a pocket, inverting the pocket through the aperture into said envelope before introducing said foam mix, whereby to form an integrated pocket in said cushion structure.

11. The method as defined in claim 1, which includes securing the ends of a length of a cover sheet member and a partitioning sheet means along a common transverse seam to form congruent, concentric continuous bands, sealing end panels peripherally of said bands along each side thereof to form a closed envelope, aperturing the exposed band and drawing the rest of the envelope therethrough to turn it inside-out to define a cushion structure having a continuous cover sheet forming the front and back faces of said cushion structure.

12. A method of making integrated cushion structures having opposed pliable cover sheet members and at least one partitioning sheet means, at least some of said sheets being joined peripherally to define an enclosing envelope having a plurality of interior compartments, and plastic foam filling at least some of said compartments, said method comprising:

forming an assemblage of said pliable cover sheet members and partitioning sheet means;

bonding at least some of said sheets together peripherally to form said envelope;

forming an aperture in an exposed sheet of said envelope, said aperture being suitably sized and located to enable all sheets to be inverted therethrough;

drawing the remaining sheets through said aperture and thereby turn said envelope inside-out to dispose cover sheet members externally and partitioning sheet means internally of said inverted envelope; and, placing said envelope into a forming mold and introducing a foamable plastic mix into said envelope, and allowing said mix to expand and become integrally bonded on polymerization to the surfaces of the respective sheets defining said envelope while in said mold.

* * * * *

UNITED STATES PATENT OFFICE
CERTIFICATE OF CORRECTION

Patent No. 4,115,170          Dated September 19, 1978

Inventor(s) Joseph F. Sanson

It is certified that error appears in the above-identified patent and that said Letters Patent are hereby corrected as shown below:

Foreign Application Priority:   Should read:

Feb. 22, 1976 [FR]              April 22, 1976 [FR]

Column 2, line 64:              Should read:

layer                           layers

Column 5, lines 28 and 29:      Should read:

0.2 and 1.4                     0.2 and 0.4

Column 7, line 13:              Should read:

14 in                           14 is

Column 9, Claim 1, line 23:     Should read:

surface                         surfaces

UNITED STATES PATENT OFFICE
CERTIFICATE OF CORRECTION

Patent No. 4,115,170      Dated September 19, 1978

Inventor(s) Joseph F. Sanson

It is certified that error appears in the above-identified patent and that said Letters Patent are hereby corrected as shown below:

Column 9, Claim 5, line 58:     Should read:

form                                foam

Signed and Sealed this

Tenth Day of April 1979

[SEAL]

Attest:

RUTH C. MASON
*Attesting Officer*

DONALD W. BANNER
*Commissioner of Patents and Trademarks*